Feb. 21, 1961  F. SIROLA  2,972,272
TOOL POST AND TOOL HOLDER
Filed June 5, 1957  2 Sheets-Sheet 1

FIG. I

INVENTOR.
FRANK SIROLA
BY *Clark & Ott*
ATTORNEYS

Feb. 21, 1961   F. SIROLA   2,972,272
TOOL POST AND TOOL HOLDER
Filed June 5, 1957   2 Sheets-Sheet 2
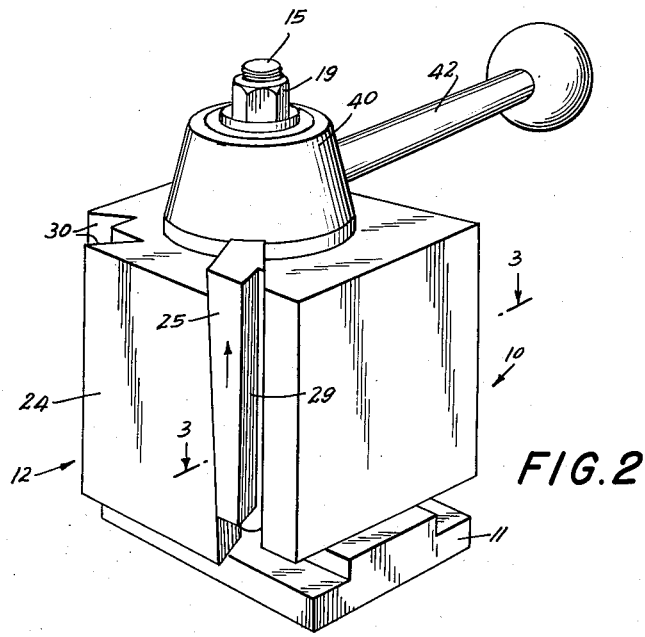
FIG.2
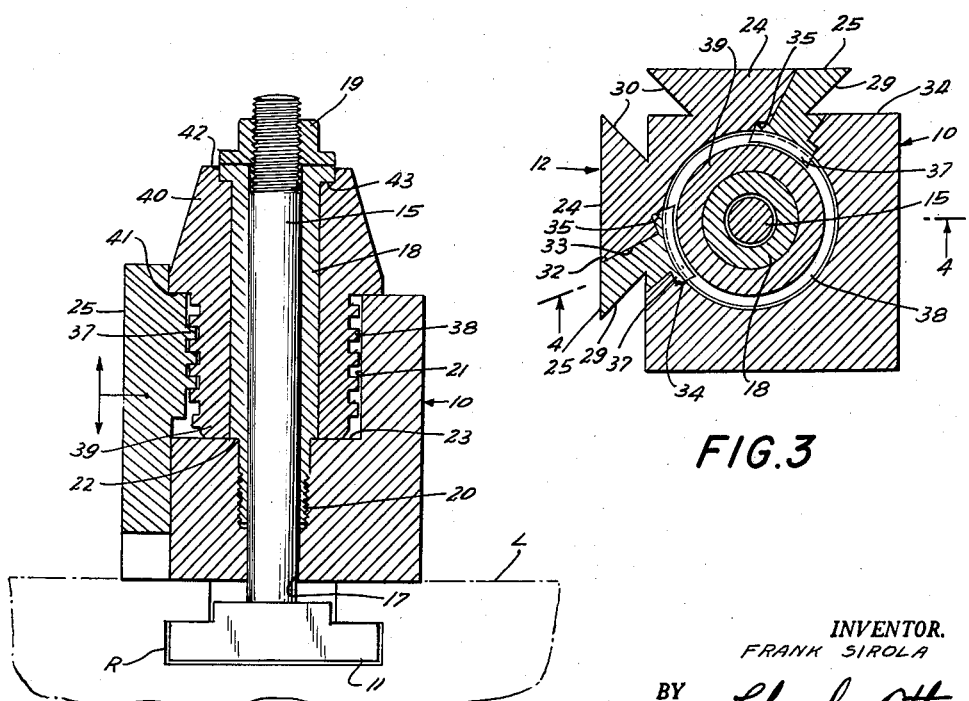
FIG.3
FIG.4
INVENTOR.
FRANK SIROLA
BY Clark & Ott
ATTORNEYS United States Patent Office 2,972,272
Patented Feb. 21, 1961

2,972,272

TOOL POST AND TOOL HOLDER

Frank Sirola, Corona, N.Y.
(47 Vreiland Ave., Clifton, N.J.)

Filed June 5, 1957, Ser. No. 663,696

3 Claims. (Cl. 82—36)

This invention relates to a tool post which is constructed for releasably mounting one or more tool holders in position thereon.

An object of the invention is to provide a tool post for a lathe and the like which is adjustable about a central axis for disposing any one of the tool holders in position to present the tool carried by the holder in proper relation to perform the desired machining operation.

A principal object of the invention is to provide a tool post and tool holder which are constructed and arranged for precision machining operations.

Another object of the invention is to provide a tool post which is constructed to permit of repeated set ups of the tool holder without changing the relative position of the tool mounted in the holder.

Another object of the invention is to provide a tool post and tool holder with interengaging dovetail tongue and slot and with wedge means forming a part of the dovetail tongue for tightening the tongue in the dovetail slot of the tool holder.

Still another object of the invention is to provide a dovetail tongue with a wedge having screw teeth on the inner face thereof engaged by a screw rotatable in the holder for camming the wedge to tighten the tongue in the dovetail slot of the holder.

Still another object of the invention is to provide means for quickly fastening the holder thereto and the release of the same therefrom by a partial turn of the rotatable screw.

With the foregoing and other objects in view, reference is now made to the following specification and accompanying drawings in which the preferred embodiment of the invention is illustrated.

In the drawings:

Fig. 2 is a perspective view of the tool holder with the parts thereof in assembled relation.

Fig. 3 is a transverse sectional view taken approximately on line 3—3 of Fig. 2.

Fig. 4 is a vertical sectional view taken approximately on line 4—4 of Fig. 3.

Figure 1:
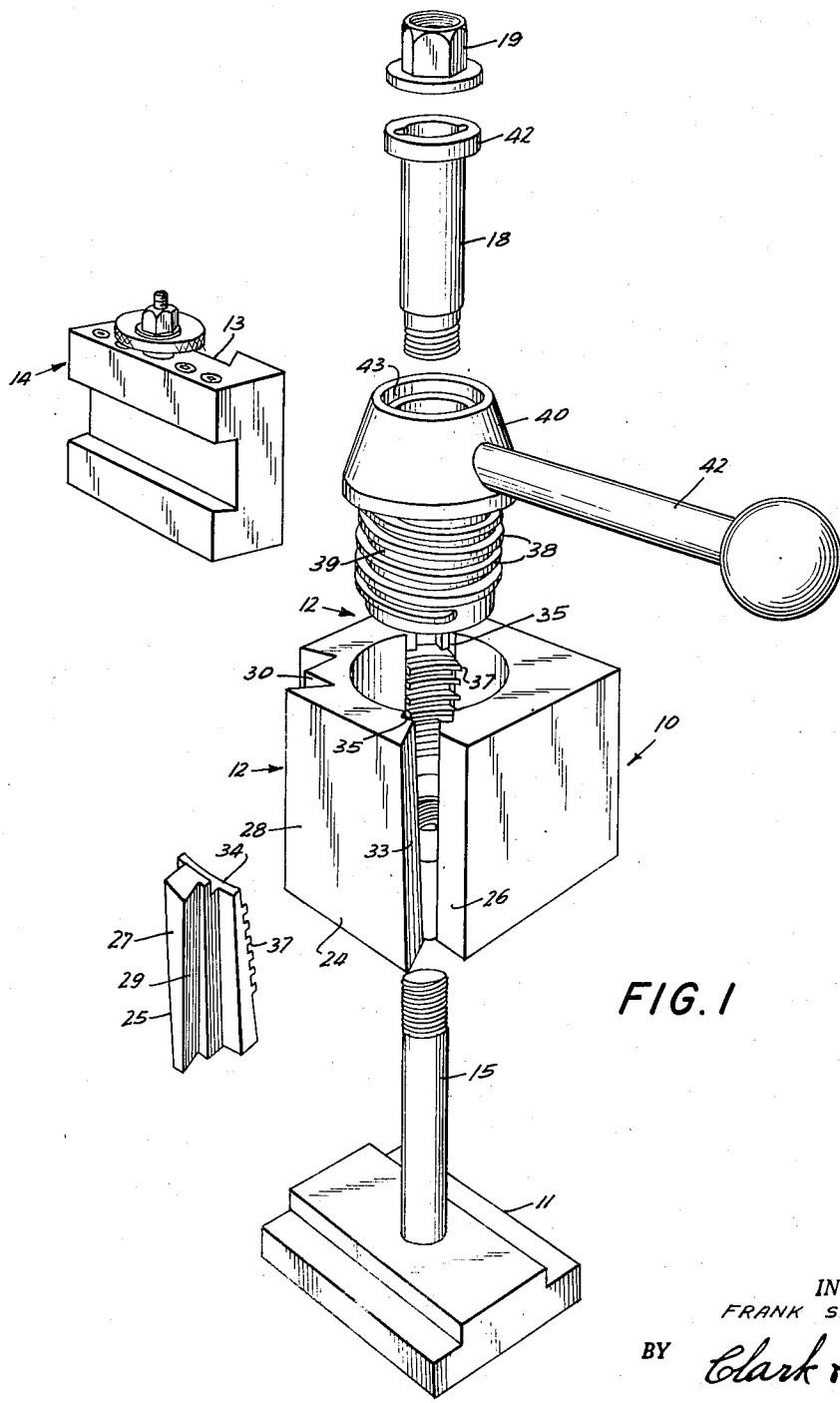
Fig. 1 is a perspective view of a tool post constructed in accordance with the invention and illustrating the same with the parts thereof disposed in separated juxtaposition and in juxtaposition to a tool holder.

Referring to the drawings, the tool post 10 is provided with a slide block 11 for securing the post on a lathe and the like. The post is formed with one or more dovetail tongues 12 which slideably fit a correspondingly shaped recess 13 in a tool holder 14. In the present embodiment, the post is provided with two dovetail tongues 12 which are disposed on upright axes parallel to the axis of the stem 15 affixed to the slide block 11 and about which the post is rotatable. It is to be understood that the post 10 may be provided with a dovetail tongue 12 on each face thereof and that the tool holder 14 may be of any desired construction for holding a tool (not shown).

The bottom face of the post rests flatly upon the upper face of the slide L of the lathe with the stem 15 extending through a central bore 17 in the post and through a flanged sleeve 18 with the protruding end of the stem being threaded and engaged by a nut 19 for tightening the slide block 11 in the cross recess R in the slide L of the lathe and for securing the post 10 in position thereon. The sleeve 18 is threaded at its lower end which engages in the threaded bore portion 20 of the post for releasably securing the sleeve to the post. Above the threaded bore portion, the bore is enlarged to provide a cylindrical cavity 21 which opens through the top of the post. The sleeve 18 is also enlarged in diameter above its threaded lower portion forming an annular shoulder 22 which seats on bottom face 23 of the cylindrical cavity 21 when the sleeve is tightened in the threaded bore portion 20.

In order to mount a tool holder on the post each of the dovetail tongues 12 include a fixed section 24 and a wedge section 25. The wedge section 25 is slideable in a slot 26 in the post to dispose a side face thereof in engagement with a side face of the fixed section and with the outer face 27 thereof flush with the outer face 28 of the fixed section. The wedge section 25 is angularly recessed at one side to form one of the dovetail recesses 29, while the opposite side of the fixed section is similarly recessed to form the other dovetail recess 30. The wedge section 25 is wider at one end than the other and as illustrated is wider at the upper end, while the fixed portion 24 is narrower at the upper end and wider at the bottom end as clearly illustrated in Figs. 1 and 2 of the drawings. This provides cooperating inclined faces 32 and 33 on the fixed and wedge sections respectively. The wedge section projects through the slot 26 and into the cylindrical cavity 21 and is formed with a widened inner portion 34 which slideably fits a slot 35 in the face of the cylindrical cavity 21. The widened inner portion 34 is formed with an arcuate inner face which is helically threaded as at 37. The said threaded inner face is disposed in engagement at all times with the helically inner end 38 of a centrally apertured hub 39. The hub 39 is swivelly mounted on the sleeve 18 and is formed with an enlarged head 40 providing a shoulder 41 which seats on the top of the post. The head 40 is provided with a handle 42 affixed thereto for manually turning the hub so as to impart downward movement to the wedge section 25 with the turning of the hub in a clockwise direction and upward movement of the wedge section by turning of the hub in a counterclockwise direction. The helical threads 37 on the arcuate inner face of the wedge section are preferably square threads, while the threaded inner end 38 of the hub 39 is preferably formed with double or triple square threads whereby relatively small turning movement of the hub will effect sufficient movement of the wedge section to secure a tool holder on the dovetail tongue 12 when the hub is moved in one direction and to loosen the tool holder by small turning movement of the hub in the opposite direction.

It will be understood that downward movement of the wedge section 25 will widen the dovetail tongue 12 so as to increase the spacing of the side faces forming the recesses 29 and 30. This lateral expansion of the dovetail tongue 12 tightens the same in the recess 13 of the tool holder 14 to thereby releasably secure the tool holder in position on the post. Furthermore, the tool holder will be cammed by the movement of the wedge section 25 into engagement with the side face of the fixed section 24 whereby the tool holder will be disposed in the same relative position with reference to the post with each set up thereof. In other words, repeated set ups may be made of the tool holder on the post without departing from the relative position of the tool holder thereon. This permits of the removal and replacement of the tool holder without altering the relative position of the tool therein whereby greater accuracy and precision in the machining of parts may be made.

The slide block 11, the sleeve 18 and the hub 40 are retained in assembled relation with the holder 14 by the nut 19 which is tightened on the stem 15 against the flanged end 42 of the sleeve. The hub is provided with an annular recess 43 in which the flanged end 42 of the sleeve is received to hold the hub in position and permit of the swivel turning movement thereof about the sleeve.

While the preferred form of the invention has been shown and described herein, it is to be understood that the same is not so limited but shall cover and include any and all modifications of the invention which fall within the purview thereof.

What is claimed is:

1. A machine tool mounting comprising a tool post having a bore opening through the top and bottom thereof, said post having a slot extending longitudinally in acute angular relation with the longitudinal axis of said bore, said slot opening through a side face of said post and having a widened inner portion opening into said bore, a slide member arranged in said slot for sliding movement longitudinally with reference to said bore and having an outer wedge shaped portion provided with a longitudinally extending exposed side face portion, and said slide member having a widened inner portion disposed in the widened inner portion of said slot for retaining said slide member in said slot, said post having a longitudinally extending dovetail tongue portion at one side of said slot and with said wedge shaped portion of said slide member forming a dovetail tongue adapted to receive a tool holder thereon, a tubular hub mounted in said bore for swivel turning movement, said hub and said widened inner portion of said slide member having interengageable threads for effecting movement of said slide member in said slot for varying the width of said dovetail tongue by turning of said hub for tightening the tool holder on said dovetail tongue, a handle member affixed to said hub for turning the same, a sleeve secured in said bore about which said hub has swivel turning movement, a stem extending axially through said sleeve in concentric relation with said hub and adapted for mounting the post on a machine, and means at the end of said stem securing said parts in assembled relation.

2. A machine tool mounting comprising a tool post having a bore opening through the top and bottom thereof, said post having a slot extending longitudinally in acute angular relation with the longitudinal axis of said bore, said slot opening through a side face of said post and having a widened inner portion opening into said bore, a slide member arranged in said slot for longitudinal movement with reference to said bore and having an outer wedge shaped portion provided with a longitudinally extending exposed side face portion, and said slide member having a widened inner portion disposed in the widened inner portion of said slot for retaining said slide member in said slot, said post having a longitudinally extending face portion disposed in spaced relation to said exposed side face portion of said slide member, said face portions providing means for engagement by a tool holder for mounting the holder on said post, a tubular hub mounted in said bore for swivel turning movement, said hub and said widened inner portion of said slide member having interengageable threads for effecting movement of said slide member in said slot for varying the width of said means for tightening the tool holder on said post by turning of said hub, a sleeve secured in said bore about which said hub has swivel turning movement, and means extending axially through said hub and post adapted for mounting the post on a machine.

3. A tool mounting comprising a tool post having a central bore therein, the post having an exterior dovetail tongue portion extending lengthwise of the bore, the tongue portion having a pair of opposed faces one extending lengthwise of the bore and the other extending at an acute angle to the axis of the bore, an elongated slot adjacent and parallel to said other face and disposed in a side of the post and communicating between the bore and the exterior of the post, an elongated slide member, means mounting the slide member for sliding movement in and lengthwise of the slot, the slide member having a pair of opposed faces extending lengthwise thereof one disposed parallel to and in slideable contact with said other face of the post tongue portion and the other disposed in a plane which intersects the plane of said one face of the post tongue portion in a line parallel to the axis of the bore, the slide member having rack gear teeth longitudinally spaced therealong and extending into the bore, a tubular hub mounted for swivel rotation in and co-axially of the bore and having gear teeth in mesh with the rack gear teeth, said hub protruding from said post and having means on the protruding end thereof for rotating the hub to thereby move the slide member lengthwise in the slot, and means extending through said hub axially of the bore for mounting the post on a machine and about which means said post is rotatable for disposing the post in any of a plurality of adjusted positions.

References Cited in the file of this patent

UNITED STATES PATENTS

| | | |
|---|---|---|
| 1,152,055 | Schellenbach | Aug. 31, 1915 |
| 1,236,200 | Miller | Aug. 7, 1917 |
| 1,552,577 | Skelton | Sept. 8, 1925 |
| 2,390,148 | Hijmans | Dec. 4, 1945 |
| 2,403,405 | Sirola | July 2, 1946 |
| 2,684,520 | Severson | July 27, 1954 |

FOREIGN PATENTS

| | | |
|---|---|---|
| 56,240 | France | June 25, 1952 |